United States Patent
Trossen et al.

(10) Patent No.: US 7,532,596 B2
(45) Date of Patent: May 12, 2009

(54) OPTIMIZED INFORMATION TRANSFER ASSOCIATED WITH RELOCATION OF AN IP SESSION IN A MOBILE COMMUNICATIONS SYSTEM

(75) Inventors: Dirk Trossen, Cambridge, MA (US); Dana Pavel, Cambridge, MA (US); Govindarajan Krishnamurthi, Arlington, MA (US); Hermant M. Chaskar, Woburn, MA (US); Ram Gopal Lakshmi Narayanan, Woburn, MA (US)

(73) Assignee: Nokia Corporation, Espoo (FI)

( * ) Notice: Subject to any disclaimer, the term of this patent is extended or adjusted under 35 U.S.C. 154(b) by 1038 days.

(21) Appl. No.: 10/414,497

(22) Filed: Apr. 16, 2003

(65) Prior Publication Data
US 2004/0005894 A1    Jan. 8, 2004

Related U.S. Application Data

(60) Provisional application No. 60/375,415, filed on Apr. 26, 2002, provisional application No. 60/379,637, filed on May 10, 2002.

(51) Int. Cl.
*H04W 4/00* (2009.01)
(52) U.S. Cl. ............... 370/331; 370/338; 455/437
(58) Field of Classification Search ............. None
See application file for complete search history.

(56) References Cited

U.S. PATENT DOCUMENTS
7,050,793 B1 * 5/2006 Kenward et al. ........ 455/414.4

FOREIGN PATENT DOCUMENTS
| WO | WO 98/23122 | 5/1998 |
| WO | WO 01/05109 | 1/2001 |
| WO | WO 03/003639 | 1/2003 |
| WO | WO 03/009624 | 1/2003 |

OTHER PUBLICATIONS

"Policy Based Access Router Selections and Context Transfers in Mobile IP Network", Gopal et al, Paris, France, Oct. 23-25, 2002, Network Control and Engineering for QoS, Security and Mobility. TC6/WG6.2 and WG6.7 Conference on Network and Engineering for QoS, Security and Mobility (Net-Con 2002).
IETF Seamoby Working Group Internet Draft, "Candidate Access Router Discovery", Liebsch et al, Oct. 2002.
IETF Seamoby Working Group Internet Draft, "A Dynamic Protocol for Candidate Access-Router Discovery", Trossen et al, Oct. 2002.

* cited by examiner

*Primary Examiner*—Bob A Phunkulh
(74) *Attorney, Agent, or Firm*—Squire, Sanders & Dempsey, LLP

(57) ABSTRACT

A solution for supporting relocation of an IP session of a mobile node during a network layer handover in a mobile communication system. In the method, from the application context information on the mobile node is detected a first set of capabilities of a network node that that facilitate maintaining the IP session. This first set of capabilities is queried from one or more potential next network node. Applicability of the potential next network node to the relocation of the IP session is determined by the capability information on the first set of capabilities.

36 Claims, 3 Drawing Sheets

OPTIMIZED INFORMATION TRANSFER ASSOCIATED WITH RELOCATION OF AN IP SESSION IN A MOBILE COMMUNICATIONS SYSTEM

REFERENCE TO RELATED APPLICATIONS

This application claims priority of U.S. Provisional Patent Application Ser. No. 60/375,415 entitled "Query-response protocol to determine candidate access routers," filed on Apr. 26, 2002, and of U.S. Provisional Patent Application Ser. No. 60/379,637 entitled "Dynamic CAR discovery" filed on May 10, 2002, the contents of which are hereby incorporated by reference.

BACKGROUND OF THE INVENTION

1. Field of the Invention

The present invention relates to mobile communication, and especially to a method for supporting a relocation of an IP session during a network layer handover in a mobile communication system, and a mobile node and a network node supporting the method.

2. Description of the Related Art

A mobile communications system refers generally to any telecommunications system wherein the access point to the system may change when users move within the service area of the system. The mobile communications network is, correspondingly, an access network providing an end user with wireless access to external networks, hosts, or services offered by specific service providers. The service area of the system may comprise different access technologies and several administrative domains.

The new mobile communication systems have been developed to facilitate widespread use of new applications, also including ones that require more bandwidth and extended transmission sessions compared to earlier technologies. On the other hand, the ubiquitous coverage of current cellular systems has led the end users to expect similar availability of services from the next generations of systems. Therefore, seamless service provisioning for the considerable range of different applications will be a critical issue for the success of the new mobile communication systems.

In the context of providing wireless access using the Internet Protocol (IP), seamless IP layer mobility refers to the ability to hand over a mobile node (MN) to a new access router (AR) with minimal disruption to the IP connectivity. Under the auspices of the Internet Engineering Task Force (IETF), a number of solutions for seamless IP layer mobility have been generated. Mobile IP, as defined in Request for Comments (RFC) 2002, is an enhancement of the Internet Protocol version 4 (IPv4) that adds mechanisms for forwarding Internet traffic to mobile nodes when they are connecting through a network other than their home network. Similar mechanisms have been developed for Internet protocol version 6, referred to as IPv6. Each mobile node is assigned a permanent home address on its home network and a care-of address that identifies the current location of the device within a network and its subnets. Each time a mobile node moves to a different network, it acquires a new care-of address. A mobility agent (also known as Home Agent) on the home network associates each permanent address with its care-of address.

As an enhancement to this, fast handover protocol allows a mobile node to configure a new care-of-address before it moves towards a new subnetwork with the aim of being able to use it directly after its connection to the new access router. Consequently, the latency time is minimized and potential loss of packets during handoff is effectively eliminated.

In the process of establishing the new forwarding path for IP flows, a mere creation of connection to the new nodes, however, might not be enough. The nodes along the new path must be prepared to provide similar forwarding treatment to the IP packets. This is especially important for services with particular requirements, such as time sensitive VoIP telephony and video and streaming services, whose successful employment in mobile environment depends heavily upon the ability to minimize the impact of the traffic redirections. A context transfer procedure is a specified method, which aims at provisioning of seamless IP layer connectivity. Context relates to the information transferred from one network entity to another as a means of re-establishing routing related services on a new subnet or a group of subnets. Context transfer thus facilitates seamless transfer of the mobile node's (also known as mobile terminal, station or device) packet session to a new access router while the session can be re-established without having to perform the entire protocol exchange between the new node and the mobile node.

In order to perform fast handover and context transfer procedures as described above, the Candidate Access Router Discovery (CARD) provides means for discovering the IP addresses of the candidate access routers, and such characteristics of the access routers that may be of interest to an MN when the access router is evaluated as a handover candidate. Through this candidate access router discovery (CARD), at the time of the IP layer handoff, the candidate access router whose capabilities appropriately match with the current requirements of the mobile node may be selected as a target access router.

The IETF Seamoby Working Group Internet Drafts "Candidate Access Router Discovery" of October 2002 and "A Dynamic Protocol for Candidate Access-Router Discovery" of October 2002 (work in progress) define two approaches for a protocol that discovers the identities of candidate access routers. However, neither of these drafts specifically define the content nor format the capability information of each access router. In the description of the procedures, it is assumed that the entire capability information is always exchanged between the communicating entities. This, however, introduces in some disadvantages to the information transfer.

Firstly, it is not likely that all data in the capability information is relevant to the decisions of IP layer handoff. On the other hand, the relevance of individual parameters of the capability information depends on the dynamically changing requirements of the sessions. For example, if the essential criteria for deciding on a next access router is the capability to provide an appropriately wide bandwidth, most of the other data in the capability information of a particular access router, such as port information, supported application functionality, authentication settings etc., is irrelevant to the actual choice. On the other hand, if the essential issue for the seamless service is the existence of a certain transcoding functionality in the new access router, the information on available QoS parameters may be redundant at that point of time. Furthermore, the unnecessary transmission of irrelevant data is especially disadvantageous when the capability information is to be transferred between a mobile node and one or more network nodes, utilizing the already scarce radio resource. The term essential in this context thus relates to a capability that facilitates maintaining an ongoing IP session during relocation, typically a special feature that is not by default available in the access router. The information on whether the essential capability is available in the access router or not is applicable for choosing the next access router for relocation of an IP session.

Additionally, there can be an inclination to minimize the amount of information exchanged between parties without any established confidentiality relationship, for example between elements under different administrative control.

Rather than declaring as much as capability information and application requirements, along with their particular values, the mobile nodes and access routers may tend to reveal information only on a need-to-know basis.

SUMMARY OF THE INVENTION

The invention, therefore, includes a method for supporting relocation of an Internet Protocol (IP) session of a mobile node during a network layer handover in a mobile communication system. The method includes detecting, from application context information on the mobile node, a first set of capabilities of a network node that facilitate maintaining the IP session. The method also includes querying from a potential next network node capability information on the first set of capabilities, and determining applicability of the potential next network node to relocation of the IP session by the capability information on the first set of capabilities.

In another embodiment, the invention also includes a mobile communication system including a mobile node and one or more network nodes. The mobile node is configured to detect, from application context information on the mobile node, a first set of capabilities of a network node that facilitate maintaining an Internet Protocol (IP) session. The mobile node is also configured to query, from a potential next network node, capability information on the first set of capabilities, and determine applicability of the potential next network node to relocation of the IP session by the capability information on the first set of capabilities.

In another embodiment, the invention also includes a mobile communication system including a mobile node and one or more network nodes, wherein the mobile node is configured to register a first set of capabilities in a first network node. The first network node is configured to query, from a potential next network node, capability information on the first set of capabilities, and determine applicability of the potential next network node to the relocation of an Internet Protocol (IP) session by the capability information on the first set of capabilities.

The invention, in another embodiment, also includes a mobile node in a mobile communication system, configured to generate application context information based on at least one ongoing Internet Protocol (IP) session in the mobile communication system, and detect from the application context information a first set of capabilities that facilitate maintaining the IP session. The mobile node is also configured to query, from a potential next network node, capability information on the first set of capabilities; and determine applicability of the potential next network node to relocation of the IP session by the capability information on the first set of capabilities.

In another embodiment, the invention also includes a network node in a mobile communication system, configured to receive a first set of capabilities from a mobile node of the mobile communication system, and query, from a potential next network node, capability information on the first set of capabilities.

In another embodiment, the invention also includes a network node for relocating an Internet Protocol (IP) session of a mobile node during a network layer handover in a mobile communication system, the network node being configured to receive a query on capability information on the first set of capabilities.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

Figure 1:
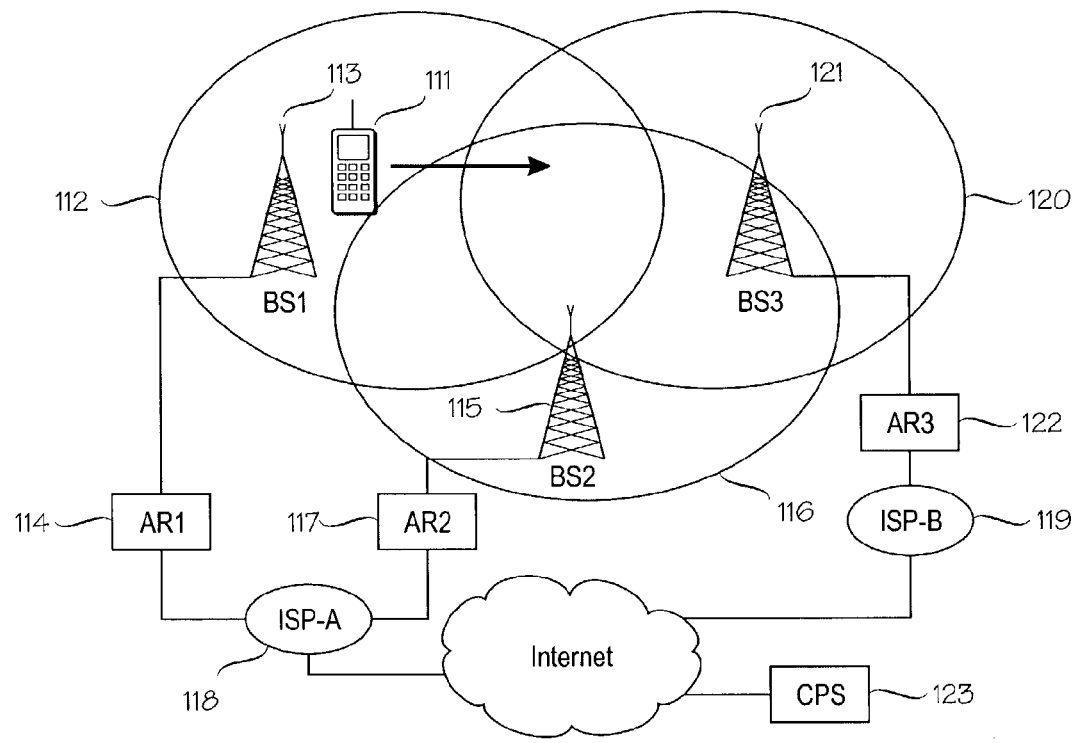
FIG. 1 shows a simplified system architecture that supports the information transfer according to an embodiment of the invention.

In one embodiment, the present invention can be applied to any mobile communication system providing packet data services for mobile nodes within a defined service area, and it can be embodied in various forms. FIG. 1 shows a simplified system architecture that supports information transfer according to an embodiment of the invention. Only basic parts of a mobile communication system 1 are illustrated; it is obvious to a person skilled in the art that the system 1 comprises numerous network nodes, functions and structures, which need not be described in greater detail herein.

The embodiment of the mobile communication system 100 of FIG. 1 shows a mobile node 111 in a current cell 112 of a current access point 113. The mobile node 111 can be an IP node that is capable of changing its point of attachment to the network. The access point 113 can be a device that provides an access link to the mobile node 111, typically a link layer (layer 2) device with a radio transceiver. The mobile node may be for example a laptop computer, mobile/cellular terminal, personal digital assistant or the like. In the illustrated embodiment, the access point 113 is a base station (BS) of the mobile communication system. The cell 112 covers a geographical area within which wireless communication between the access point 113 and the mobile node 111 is possible. A current access router 114 acts as an IP router for the current access point 113. One access router may be connected to one or more access points, and one access network comprises one or more access routers. An access point may be a separate physical entity or co-located with an access router. The mobile node 111 is attached to the current cell 112 but may be simultaneously communicating with access points of surrounding cells 116, 120 in order to be able to change its point of attachment whenever necessary. A mobile node 111 travelling to the direction of the arrow, as shown in FIG. 1, will at some point of time enter the coverage of the first potential next cell 116 provided by a first potential next access point 115, and coverage of the second potential next cell 120, provided by a second potential next access point 121. A more detailed functional description of a mobile node and of a network node is given with reference to FIGS. 8 and 9.

In the embodiment of FIG. 1, the current access router 114 is thus connected to the current access point 113. The current access router 114 and a first potential next access router 117 are included in the access network of the current administrative control (ISP-A) 118. A collection of networks under the same administrative control, grouped together for administrative purposes, constitutes one administrative domain. For clarity's sake only some of the network elements for describing the embodiment in one access network for the administrative domains are shown. It is clear that an administrative domain may include several networks that may implement different access technologies, and each access network can include a plurality of network elements not shown in the drawing. The second potential next cell 120 is part of another administrative domain, controlled by a second administrative control (ISP-B) 119. A person of skill in the art would be able to make and use the invention based on the information contained herein.

The point of attachment of the mobile node 111 can be defined with an IP address. Each mobile node 111 is assigned a home address, and according to the need, one or more care-of-addresses. The home address is an IP address permanently assigned to a mobile node and stored in the home network. When the mobile node is not attached to the home network, the incoming datagrams destined to the mobile node are encapsulated and sent from the home network to the care-of address of the mobile node. In mobile IPv6, mobile nodes may be identified with a home address stored by its home agent.

A packet data connection between users or between users and applications during which data can be transferred between the participants is called a session. In the embodiment of FIG. 1, the mobile node 111 has a session with an application server 123 for data transfer related to a defined communication application. A session can include transmission of any type of data, for example, voice or video data. The mobile nodes may have several simultaneous connections to different service applications.

A network layer handover provides a procedure by which the mobile node 111 can change its point of attachment to the network. When the mobile node 111 changes its point of attachment from the current access point 113 to another access point connected to the same current access router 114 a network layer (layer 2) handover occurs, which is transparent to the routing at the IP layer. When the mobile node 111 changes its point of attachment from the current access point 113 to another access point 121 connected to another access router 122 also an IP layer handover occurs, preferably as defined by the Mobile IP of the IETF. In one embodiment, the present invention relates to a method and apparatus for minimizing the interference by the IP layer handover at the network layer handover to the ongoing session between the mobile node 111 and the application server 123.

While the mobile node 111 is in the current cell 112 of the current access point 113 of the current access router 114, the access routers 117, 122, serving the potential next access points 115, 121 of the potential next cells 116, 120, are potential next access routers for the mobile node for to performing an IP level handover with. The mobile node 111 essentially supports the wireless interface of the potential next access points 115, 121 connected to the potential next access routers 117, 122 and the coverage of the access points 115, 121 of the potential next access routers (here the cells 116, 120) can essentially overlap with the coverage of the current access router 114 (here cell 112). The potential next access router discovery (CARD), for example as specified in the IETF document D. Trossen et al., "A Dynamic Protocol for Candidate Access Router Discovery", Work In Progress, IETF Internet Draft, October 2002, describes a procedure for identifying the potential next access routers, and also discovering the characteristics of their offered services when considered as a handoff candidate. Based on the information thus available, a group of candidate access routers may be selected, and one of which may be further selected as a target access router (TAR). The selection of TAR typically takes into account the capabilities of potential next access routers, preferences of the mobile node and potential local policies. The invention relates to with information transfer facilitating the selection, and thus the TAR selection as such, does not fall in the scope of the invention.

In the embodiment of FIG. 1, assume that a user carrying the mobile node 111 is moving in the direction of the arrow. The mobile node is engaged to a session with an application server 123 for an ongoing application that requires special services from the mobile network. The special services may relate to any feature or functionality facilitated by a specific access router, for example quality of service for transmission, security level, header compression, availability of transcoding service element, etc. Thereby, for example, the downlink data packets are flowing from the application server 123 through the serving access router 114 under the first administrative control 118 to the serving access point 113, and linked over the radio interface to the mobile node.

The radio access network comprises defined mechanisms for network level handover control. In order to prepare also for the coming IP level handover, the IP address of the potential next access routers 117 and 122 that connect to the potential next access points 115, 121 are identified. There are several possibilities for this reverse address translation. In some cases the AP beacon comprises the IP address of the access router the AP is connected to. In the prior art, mechanisms are also proposed for caching the mapping between the L2 addresses of the neighbouring access points and IP addresses of the access routers connected to them into dedicated network nodes. The choice of procedure for identifying the potential new access routers is not, as such, essential for the present invention.

Figure 2:
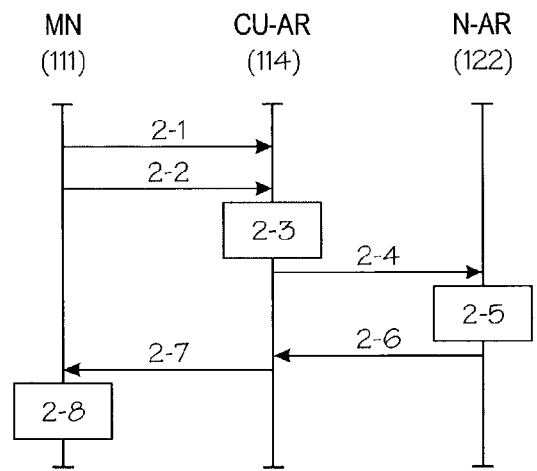
FIG. 2 shows a flow chart of information transfer according to an embodiment of the invention.

Referring to the flow chart of FIG. 2, at some point before the handoff, the mobile node 111 will generate an application context for the ongoing session with the application server 123. The application context comprises general information of the application semantic, possibly including information of the current state of the session. The application context information on the current state of the session facilitates re-establishment of the session on a new access router without having to re-perform the entire protocol exchange between the mobile node and the new access router. There are various possibilities for generating the application context. The application context may, for example, be based on descriptive information on session description protocol in the session initiation protocol (SIP) messages between the mobile node 111 and the application server 123. The application context is provided in a predefined format of information elements that allows it to be supported in access routers as well. The format may be according to a specified standard, as the ones recommended by the IETF. Examples of such standards are Distributed Component Object Model (DCOM), Simple Object Access Protocol (SOAP), Common Object Request Broker Architecture (CORBA), Enterprise Java Beans (EJB), and Type Length Value (TLV), Extensible Markup Language (XML).

The application context information is essentially generated in the mobile node, but it may also include information related to the correspondent node of the mobile node. Some application functionality of the correspondent node of the mobile node may depend on the location of the mobile node, for example a web server that tailors the content of the delivered web page based on the location of the mobile user. In such a case, for maintaining an IP session, it is necessary that the application context information includes such information on the correspondent node as well, preferably included in the same message generated by the mobile node.

It should be noted that the above-mentioned concept of application context information constitutes the framework of the application semantics, which is fundamental for the ongoing session between a mobile node and an application server. The application context information serves as a basis for extracting the required access router capabilities. In some cases said application context information can be directly mapped onto the required access router capability information, and in some cases further processing is necessary. The procedure of deriving the necessity of a certain access router capability by the mobile node, from the application context information, is not as such essential for the invention.

In this embodiment, it is assumed that the selection of the target access router for handover is implemented in the mobile node. It is further assumed that a set of possible capabilities exists that may be supported by access routers. In the mobile node that is actively monitoring neighbouring access points for handover, a selection module can define (step 2-1) a set of one or more access router capabilities that are used for maintaining the IP session. These capabilities are used for maintaining seamless execution of the application, and should be ensured also during the relocation for the IP session from the current access router to the next access router. Hereinafter, such a set of capabilities is called Capabilities of Interest (CoI). The CoI may comprise static information, typical of the mobile node, and/or dynamic information that may vary on a temporary basis according to the current context. For example, a mobile node 111 in an ongoing session with the application server 123, utilizing service that requires a defined wide bandwidth, may include the dynamically changing available bandwidth as a capability in the CoI. Correspondingly, the mobile node may require that a more static playout buffer support capability exists in the next access router. The CoI are mainly related to routing-related functionalities, but also can relate to some higher level capabilities, such as security gateway collocation, audio/video mixing capability, location tracking capability e.g. through WLAN triangulation, can be included in the CoI.

Additionally, the mobile node may define a condition for each of the capabilities in the CoI, the condition providing a way to compare the capabilities of the responding access routers against the capabilities required by the mobile node for facilitating seamless progress of the application despite the relocation of the IP session. The condition may, for example, be indicated as a limiting factor against which the capability information received from access routers may be compared. In the above example, the mobile node 111 may determine that the condition for seamless relocation of the IP session is that the next access router supports a throughput capacity of 200 kBits. Correspondingly, the condition by the mobile node may require the Boolean value true for a playout buffer support capability.

In step 2-1, the mobile node forwards a message including the defined CoI and CoI conditions to the current access router 114. In step 2-2, the mobile node 111 sends a message including the identified address information of the new access router 122 to the current access router 114. By the message of step 2-2, the mobile node identifies a potential new access router 122 to be involved in access router capability information transfer. The mobile node may indicate the access router 122, for example, by its L2 address, or by its IP address. Sometimes the access point 121 beacon may include the IP address of the associated access router 122, and in such a case the mobile node 111 may forward it directly to the appropriate network node, here the serving access router 114. Otherwise the mobile node forwards the L2 address of the particular access point 121 to the serving access router 114 which manages the reverse address translation.

As described above, the defined CoI, the CoI conditions, and the address information may be carried in at least two separate messages, i.e. the message associated with CoI information and the message carrying the identity information on the new potential access router. This is typically the case when the CoI information is first transferred to the corresponding network node, and the transfer of identity information on new access routers is initiated later by the mobile node in response to a received access point beacon from a potential new access point. However, this information, and thus steps 2-1 and 2-2, may also be merged into one message.

In step 2-3, the received address information is analyzed by the current access router. If the address information includes the IP address of the potential next access router, the CoI information can be substantially forwarded to the addressed potential next access router as such (step 2-4). If the address information includes only a layer 2 identifier of an access point associated with a particular access router, step 2-3 also includes a reverse address translation as suggested above, and, for example, according to the IETF Seamoby Working Group Internet Draft "Candidate Access Router Discovery" of October 2002.

In step 2-5, the potential next access router analyzes the received CoI query, and based on its capabilities, generates a CoI response, which indicates the ability of the access router to meet the conditions defined for the CoI in the CoI query, if CoI conditions were given in the original query. Otherwise, the response may contain the current value for each of the requested capabilities. In step 2-6, the potential next access router transfers the CoI response to the current access router, which forwards the CoI response to the mobile node (step 2-7). The format of the message, such as the query and the response, is, as such, not essential for the invention, for example appropriate Internet control message protocol (ICMP) messages or user datagram protocol (UDP) messages may be used. The response may also be formulated in several ways depending on the format and content of the query. In one example, the access router receives a list of CoI and returns its own values for the requested CoI. If the query also comprises the conditions to be met, the access router may already perform some matching of its capabilities against the required conditions.

In step 2-8, the response received from the potential next access router with the described CoI query procedure is evaluated based on the required capabilities. The outcome of the evaluation is thereafter available to be used in selection of the target access router for handover. In the actual selection of target access router a plurality of other factors affecting the selection may be considered, the ability to seamlessly relocate the IP session described herein being only one of them.

As a modification of this embodiment, part of the CoI capabilities may be arranged to be treated as mandatory, and part as optional. For example, the mobile node may indicate the bandwidth capability as mandatory and the playout buffer support as optional. The optional capabilities may be utilized to refine the target access router selection by facilitating comparison between candidates that fulfill the mandatory requirements.

As another modification of this embodiment, the information transfer may be configured to take place directly between the mobile node 111 and the potential next access router 122, without involving the current access router 114 in the communication. One requisite for such information transfer is that there is an existing IP connection exists between the mobile node and the potential next access router. In such a case, the steps 2-3 to 2-4 may be replaced by a dedicated query message from the mobile node to the candidate access router, and steps 2-6 to 2-7 may be replaced by a dedicated response message from the potential next access router to the mobile node.

Figure 3:
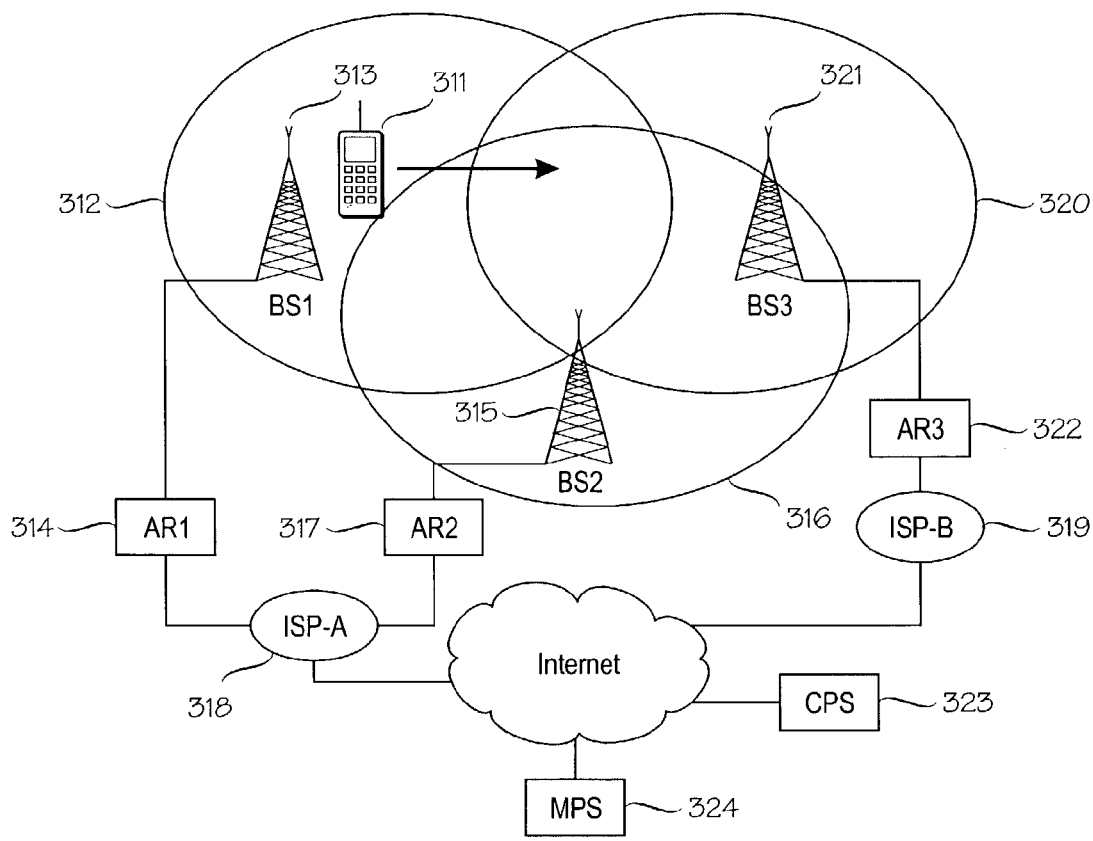
FIG. 3 shows a simplified system architecture according to another embodiment of the invention.

In another embodiment of the invention, the comparison between the capabilities required by the mobile node 111 and the capabilities indicated by a potential next access router 122 is implemented in the network side, in a defined network node, hereinafter called a mobile proxy server. An embodiment of the communication system is shown in FIG. 3. The elements 311 to 323 of FIG. 3 can correspond to the elements 111 to 123 of FIG. 1, and will not be re-described herein.

According to the current embodiment, a mobile proxy server 324 is further connected to the mobile communication system. In FIG. 3, the connection of one mobile proxy server 324 is shown via the Internet. The mobile communication system may include one or more of such servers, and that a mobile proxy server 324 can also be located in any of the access networks of the mobile communication system. The mobile proxy server 324 can be a separate physical network element or it can be implemented as a logical unit integrated together within another network element.

One role of a mobile proxy server 324 in the context of this embodiment of the present invention is to maintain updated personal information on the mobile user. An implementation of this is, for example, a server for executing advanced applications, targeted to facilitate providing of services that are chosen and/or tailored according to the current personal information of the mobile user. Such a mobile proxy server 324 is configured to collect static and dynamic information from various sources and, based on the dynamically changing personal status and context information of the mobile user, provides a defined service or defined services for the user. The collected information may, for example, comprise a user location, user profile input by the user himself or herself, background data retrieved via the Internet, monitoring data on the physical or emotional status of the user, status of the ongoing applications, etc. For example, let us consider that the application is configured to pull out information from a data source for user location information, a data source for event schedules, a data source for league information, and a data source for user monitoring data. Let us assume that the data source for location information indicates the mobile user to be in a football stadium, the data source for event schedules indicates a particular match to take place in the detected football stadium, the data source for league information facilitates listing all the other teams in the league that the particular match may concern and, additionally, user monitoring data that indicates that the user does not feel enthusiastic about the progress of the current game. Based on this information, the application may be configured to trigger a service where it retrieves clippings of goals and scores of the other simultaneously ongoing matches of that league, and offers them to the user.

In order to maintain relevant dynamic information in the mobile proxy server 324, the mobile node 311 transfers relevant application context information and monitoring information to the mobile proxy server 324. Between the mobile node 111 and the mobile proxy server 324 is a trust relationship, which means that appropriate security measures for ensuring the identity of the communicating parties and the integrity of the exchanged messages are taken in their mutual communication. Such measures may include authentication and encryption procedures, generally known to a person skilled in the art. Through this proxy arrangement, updated information for generating the application context information for a mobile node is made available in the network side, thus being available for the purpose of the present invention. The mobile proxy server may also be a logical entity integrated within another network node, for example in the serving access node. A more detailed description of the functional structure of the mobile proxy server is discussed below in connection with FIG. 8.

Figure 4:
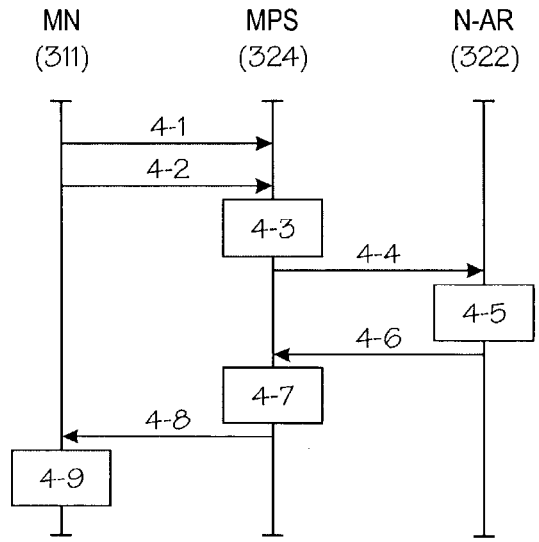
FIG. 4 shows a flow chart illustrating information transfer in the embodiment of FIG. 3.

In FIG. 4, the information transfer according to the current embodiment is shown. The concepts of defining the CoI in steps 4-1 and 4-2 can correspond to the ones used in describing steps 2-1 to 2-2 of FIG. 2 and need not be re-described here. In step 4-1, the mobile node 311 sends a message comprising the defined CoI, the defined CoI conditions, to the mobile proxy server 324. As in the previous embodiment, steps 4-1 and 4-2 may be one single message, or include at least two separate messages, i.e. the one associated with CoI information may be sent separately from the identity information of the new potential access routers. It is thus possible that the mobile node first transfers the CoI information to the mobile proxy server, and the identity information on a new access router at one or more later messages, for example any time it receives an access point beacon from a new access point.

In step 4-3 the CoI and address information received from the mobile node are analyzed in the mobile proxy server 324 as described in step 2-3 of FIG. 2. Furthermore, it is possible that in the mobile proxy server 324 there is stored some capability information of the neighbouring access routers, which may be utilized for accelerating or enhancing the process at this stage. This caching option is discussed in more detail later.

At a defined time, for example in response to a received message from the mobile node carrying information on a potential next access router identity, the mobile proxy server 324 generates a message comprising the CoI information query of the mobile node, and sends it to the identified potential next access router 322 (step 4-4). The access router analyzes the CoI requirements against its capabilities and resource status (step 4-5) and sends back a response to the mobile proxy server (step 4-6). Based on comparison between the stored CoI information on the mobile node and the CoI response received from the new access router, the mobile proxy server 324 generates an outcome of the matching (step 4-7). This outcome is thereafter available to be used in selection of the target access router for handover. As mentioned earlier, the actual procedure of target access router selection may comprise a plurality of other factors affecting the selection, and is as such not essential for this invention. In step 4-8, the outcome of the matching is forwarded to the mobile node, and/or any derivatives thereof generated in the mobile proxy. Such a derivative may, for example, be a recommendation on the suitability of the new access router for handover, or a result of a target access router selection procedure executed in the mobile proxy server 324.

As mentioned earlier, as a modification of the present embodiment, the mobile proxy server 324 may be configured to cache information regarding the neighboring access routers it has been communicating with. In such a case, step 4-7 comprises the mobile proxy server 324 analyzing the response 4-6 received from the potential next access router, identifying the information that is applicable for further use, and storing that information. It is clear that part of the information from the new access router is dynamic and is thus applicable only for a short period after the response. On the other hand, part of the information is essentially static, or at least very slowly changing, and can thus also be utilized later on. For example, the value for the available bandwidth typically varies with time, and is preferably requested every time it is included in the CoI information on a mobile node. On the other hand, the availability of the playout buffer support is a more static value that is not expected to change over time, and needs not be requested every time it is included in the CoI information of a mobile node. Such division into slowly and dynamically changing capabilities, however, requires some kind of update procedure to allow some less dynamic, but still evident changes that occur over longer periods of time. In its simplest form, such an update procedure comprises the mobile proxy server being configured to periodically request the values from the neighboring access routers for the slowly changing CoI information elements. The rules for identifying slowly and dynamically changing capability information may be stored and applied by the mobile proxy server 324, or at least part of the identification may be implemented in the access routers. The access router may, for example, in its response, mark the CoI values as static and dynamic, wherein the receiving mobile proxy server is configured to store the static values for the particular access router. With this caching arrangement, the size of the query-response messages for facilitating seamless relocation of sessions can be further reduced. In some cases, the comparison of the CoI information from the mobile node and the CoI information of the neighbouring access routers may be derived completely from the information stored in the mobile proxy server, without going through the query-response-steps of 4-4 to 4-6 at all.

As another modification of the present embodiment, the mobile proxy server and the neighbouring access routers may be configured to notify each other upon changes in the capabilities. In such a case, the mobile proxy server in step 4-3 includes in the query message an indication on the capabilities, of which it requests the access router to send status updates at defined instances, for example immediately after a substantial change in the value, or at pre-defined periodic intervals. Correspondingly, the access router can be configured to send the response as described earlier in connection with step 4-6, but additionally to send one or more additional response messages to inform the mobile proxy server about the status and/or changes in the capabilities, as requested by the mobile proxy server. The update procedure may be configured to terminate automatically after a pre-defined period of time, or a notification termination procedure may be established. For example, the mobile proxy may be configured to re-send the message of step 4-4, the message being amended to comprise a marker that indicates that the values need not be sent anymore. With this notification arrangement, the above caching arrangement is further enhanced.

As referred to earlier, the format of the messages exchanged between the elements in FIGS. 1 and 3 is, as such, not essential for the invention. However, appropriate Internet control message protocol (ICMP) messages or user datagram protocol (UDP) messages are applicable to the purpose.

Figure 5:
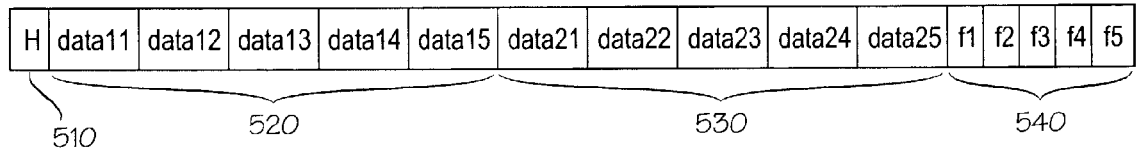
FIG. 5 illustrates a diagrammatic representation of a CoI query.

In FIG. 5, a diagrammatic representation of an illustrative CoI query is shown. The data block 500 includes a header part 510 for header information that precedes data, and a parameter part 520, and the value part 530. The parameter part 520 comprises a group of information elements data11 . . . data15, which are essentially data fields of equal or different amounts of bits. An information element of the parameter part essentially identifies a parameter associated with a capability of an access router. Some other parameters, associated with other elements of the data transfer in the communication system, may also be included in the data block. The optional value part 530 comprises a group of information elements data21 . . . data25, each of which is associated with a corresponding information element of the parameter part, and which essentially indicate the condition for the associated parameters. The data block 500 may also include a flag part 540, which carries a group f1, f2, . . . f5 of flag bits, each flag bit of the flag part 540 being associated with an information element of the parameter part and of the value part, and used to mark or denote the parameters with additional definitions. Examples of such definitions and optional/non-optional, dynamic/static etc., as discussed earlier.

Figure 6:
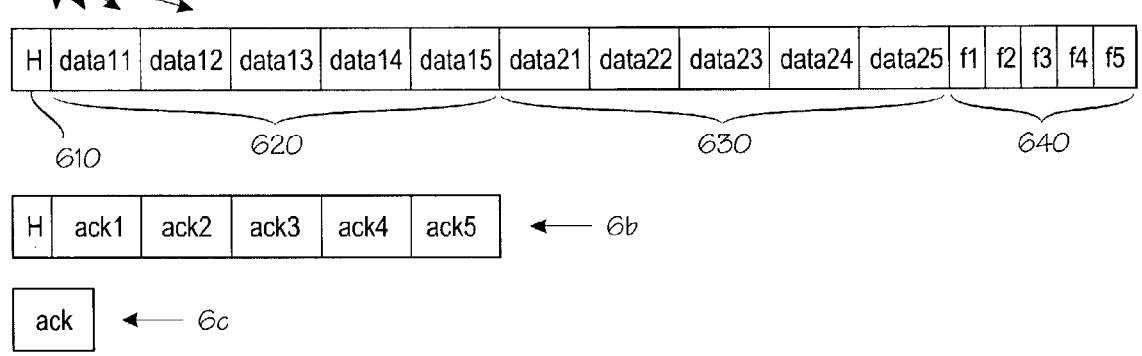
FIG. 6 illustrates a diagrammatic data block of a corresponding CoI response to the query of FIG. 5.

FIG. 6 illustrates a diagrammatic response on some alternative CoI responses to the query of FIG. 5. The response may be configured to follow the format of the query, and thus include the corresponding information in the same defined format, as shown in option 6a, only replacing the values of the responding access router to the information elements in the value part 630. Furthermore, as discussed earlier, the flag part 640 of the response may be used to indicate whether the value in the corresponding field of the value part 630 changes dynamically or not. In option 6b, an alternative response comprising a group of data blocks ack1 . . . ack5 carrying an acknowledgement stating whether the corresponding condition indicated in the value part 530 of the query can be met by the access router or not. Instead of acknowledgements, also percentual estimates of the degree the limiting value or the condition can meet may be indicated. As it is likely that there may be challenges to ubiquitously require all access routers to freely submit their capability information, especially outside their own administrative domains, the response may be a simple acknowledgement message. Option 6c illustrates this alternative where an acknowledgement ack1 of the access router indicates whether or not it can meet all the conditions 530 requested in the query.

Figure 7:
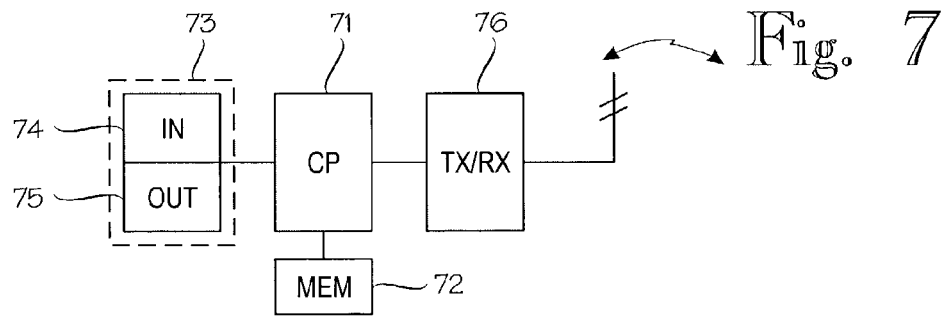
FIG. 7 shows a logical functional structure of a mobile node.

Hereinafter, reference is made to a more detailed functional description of the mobile node referring to FIG. 7. The mobile node 111 includes processor or processing means 71, an element that includes an arithmetic logic unit, a number of special registers and control circuits. Connected to the processing means are a memory unit or memory means 72, a data medium where computer-readable data or programs or user data can be stored. The memory means typically includes memory units that allow both reading and writing (RAM), and a memory whose contents can only be read (ROM). The mobile node also comprises an interface block 73 with an input or input means 74 for inputting data by the user for internal processing in the unit, and output or output means 75 for outputting user data from the internal processes of the unit. Examples of input means can include a keypad, or a touch screen, a microphone, or the like. Examples of the output means include a screen, a touch screen, a loudspeaker, or the like. The mobile node also includes a radio unit 76 that is connected to the central processing means, and configured with receiving means for receiving information from the air interface and processing it for inputting to the processing means 71, as well as with transmitting means for receiving information from the processing means 71, and processing it for sending via the air interface. The implementation of such a radio unit is generally known to a person skilled in the art. The processing means 71, memory means 72, interface block 73, and radio unit 76 can be electrically interconnected for performing systematic execution of operations on the received and/or stored data according to the predefined, essentially programmed processes of the unit. In a solution according to the invention, the operations comprise the functionality of the mobile node as described above.

Figure 8:
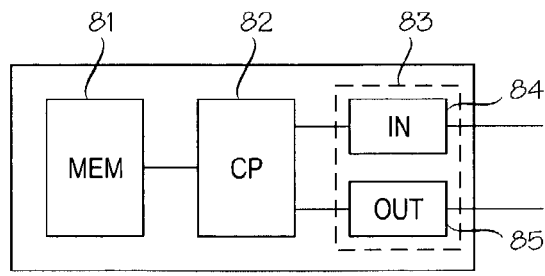
FIG. 8 shows a logical functional structure of a network node.

Correspondingly, FIG. 8 schematically illustrates an example of a basic functional structure of a network node of the communications system as discussed above. Such nodes mentioned include, for example, access points, serving access routers, candidate access routers, and target access routers. The node includes processor or processing means 81, an element that can include an arithmetic logic unit, a number of special registers and control circuits. Connected to the processing means are memory means 82, a data medium where computer-readable data or programs or user data can be stored. The memory means typically includes memory units that allow both reading and writing (RAM), and a memory whose contents can only be read (ROM). The unit also includes an interface block 83 with input means 84 for inputting data for internal processing in the unit, and output means 85 for outputting data from the internal processes of the unit. Examples of the input means include a plug-in unit acting as a gateway for the information delivered to its external connection points. For receiving information on the operator of the network node, the network node may also include a keypad, or a touch screen, a microphone, or the like. Examples of the output means include a plug-in unit feeding information to the lines connected to its external connection points. For outputting information to the operator of the network node, it may also include a screen, a touch screen, a loudspeaker, or the like. The processing means 81, memory means 82, and interface block 83 can be electrically interconnected for performing systematic execution of operations on the received and/or stored data according to the predefined, essentially programmed processes of the unit. In a solution according to the invention, the operations comprise a functionality for implementing the operations as described above.

It will be obvious to a person skilled in the art that as technology advances, the inventive concept can be implemented in various ways. The invention and its embodiments are not limited to the examples described above but may vary within the scope of the claims.

The invention claimed is:

1. A method, comprising:
   detecting in a mobile node or in a mobile proxy server, from application context information on the mobile node, a first set of capabilities of a network node that facilitate maintaining an internet protocol session of an application, the first set of capabilities being a subset of a defined system set of capabilities;
   querying from a potential next network node capability information on the first set of capabilities; and
   determining applicability of the potential next network node for supporting a relocation of the internet protocol session of the mobile node by the capability information on the first set of capabilities during a network layer handover in a mobile communication system, the mobile communication system being configured to provide the defined system set of capabilities that are fully or partially supported by network nodes of the mobile communication system.

2. A method according to claim 1, further comprising:
   defining conditions for the first set of capabilities,
   wherein determining the applicability of the potential next network node for the relocation of the internet protocol session comprises determining according to an ability of the potential next network node to meet the defined conditions.

3. A method according to claim 1, further comprising:
   responding to the query with a list of values of the potential next network node for the queried capabilities.

4. A method according to claim 2, further comprising:
   indicating, in a query on a condition, that a queried capability is requested to meet; and
   responding to the query by indicating whether one or more of the defined conditions are met by the potential next network node.

5. A method according to claim 2, further comprising:
   indicating, in a query on a condition, that a queried capability is requested to meet;
   responding to the query by indicating whether all the defined conditions are met by the potential next network node.

6. A method according to claim 1, further comprising:
   registering the first set of capabilities in a first network node; and
   querying information on the first set of capabilities from a potential next network node by said first network node.

7. A method according to claim 6, further comprising:
   storing, in the first network node, information received from a potential next network node in a response to the query; and
   utilizing the stored information as capability information on the potential next network node.

8. A method according to claim 2, further comprising:
   identifying a part of the capabilities in the first set of capabilities as mandatory capabilities.

9. A method according to claim 7, further comprising:
   excluding information on capabilities that vary for each separate internet protocol session from storing in the first network node.

10. A system, comprising:
    a mobile node; and
    one or more network nodes,
    wherein the system is configured to provide a defined system set of capabilities that are fully or partially supported by the one or more network nodes of the system, and
    wherein the mobile node is configured to:
    detect, from application context information on the mobile node, a first set of capabilities of a network node that facilitate maintaining an internet protocol session of an application, the first set of capabilities being a subset of the defined system set of capabilities;
    query, from a potential next network node, capability information on the first set of capabilities; and
    determine an applicability of the potential next network node for relocation of the internet protocol session by the capability information on the first set of capabilities.

11. An apparatus, comprising:
    a processor configured to:
    generate application context information based on at least one ongoing internet protocol session in system;
    detect from the application context information a first set of capabilities that facilitate maintaining the internet protocol session of an application, the first set of capabilities being a subset of a defined system set of capabilities;
    query, from a potential next network node, capability information on the first set of capabilities; and
    determine an applicability of a potential next network node for relocation of the internet protocol session by the capability information on the first set of capabilities,
    wherein the apparatus is configured in the system, the system being configured to provide a defined system set of capabilities that are fully or partially supported by one or more network nodes of the system.

12. An apparatus according to claim 11, wherein the processor is further configured to:
    define conditions for the first set of capabilities,
    wherein being configured to determine the applicability of the potential next network node for the relocation of the internet protocol session comprises being further configured to determine according to an ability of the potential next network node to meet the defined conditions.

13. An apparatus according to claim 11, wherein the processor is further configured to:
    register the first set of capabilities in a first network node.

14. An apparatus according to claim 11, wherein the processor is further configured to:
    identify a part of defined conditions for the first set of capabilities as mandatory conditions.

15. An apparatus, comprising:
    a processor configured to:
    receive from a mobile node of a mobile communication system a first set of capabilities that facilitate maintaining an internet protocol session of an application, the first set of capabilities being a subset of a defined system set of capabilities; and
    query, from a potential next network node, capability information on the first set of capabilities,
    wherein the apparatus is configured in the mobile communication system, the mobile communication system being configured to provide a defined system set of capabilities that are fully or partially supported by one or more network nodes of the mobile communication system.

16. An apparatus according to claim 15, wherein the processor is further configured to:
  determine an applicability of the potential next network node for relocation of the internet protocol session by the capability information on the first set of capabilities.

17. An apparatus according to claim 15, wherein the processor is further configured to:
  receive a set of conditions for the first set of capabilities;
  wherein being configured to determine the applicability of the potential next network node for the relocation of the internet protocol session comprises further being configured to determine according to the ability of the potential next network node to meet the defined conditions.

18. An apparatus according to claim 15, wherein the processor is further configured to:
  store the capability information received from the potential next network node in response to the query; and
  utilize the stored capability information as capability information on the potential next network node.

19. An apparatus according to claim 15, wherein the processor is further configured to:
  exclude information on capabilities that vary for each separate internet protocol session from storing in a first network node.

20. An apparatus according to claim 15, wherein the apparatus is in a current access router of the mobile node.

21. An apparatus according to claim 15, wherein the apparatus is in a mobile proxy server in the mobile communication system.

22. An apparatus, comprising:
  a processor configured to receive from a mobile node or a mobile proxy server a query on capability information on a first set of capabilities that facilitate maintaining an internet protocol session of an application, the first set of capabilities being a subset of a defined system set of capabilities,
  wherein the apparatus is configured to relocate the internet protocol session of a mobile node during a network layer handover in a mobile communication system, the mobile communication system being configured to provide a defined system set of capabilities that are fully or partially supported by one or more network nodes of the mobile communication system.

23. An apparatus according to claim 22, wherein the processor is further configured to:
  respond to the query with a list of values of a potential next network node for the queried first set of capabilities.

24. An apparatus according to claim 22, wherein the processor is further configured to:
  respond to the query by indicating whether one or more conditions are met by the potential next network node.

25. An apparatus according to claim 22, wherein the processor is further configured to:
  respond to the query with an indication whether all conditions are met by the potential next network node.

26. An apparatus according to claim 22, wherein the processor is further configured to:
  indicate in the capability information capabilities that vary for each separate internet protocol session.

27. An apparatus, comprising:
  generation means for generating application context information based on at least one ongoing internet protocol session of the apparatus in a mobile communication system;
  detection means for detecting from the application context information a first set of capabilities that facilitate maintaining an internet protocol session of an application, the first set of capabilities being a subset of a defined system set of capabilities;
  querying means for querying, from a potential next network node, capability information on the first set of capabilities; and
  determination means for determining an applicability of the potential next network node for relocation of the internet protocol session by the capability information on the first set of capabilities,
  wherein the apparatus is configured in a mobile communication system, the mobile communication system being configured to provide a defined system set of capabilities that are fully or partially supported by one or more network nodes of the mobile communication system.

28. An apparatus, comprising:
  receiving means for receiving from a mobile node of a mobile communication system a first set of capabilities that facilitate maintaining an internet protocol session of an application, the first set of capabilities being a subset of a defined system set of capabilities; and
  querying means for querying, from a potential next network node, capability information on the first set of capabilities,
  wherein the apparatus is configured in a mobile communication system, the mobile communication system being configured to provide a defined system set of capabilities that are fully or partially supported by one or more network nodes of the mobile communication system.

29. An apparatus, comprising:
  receiving means for receiving from a mobile node or a mobile proxy a query on capability information on a first set of capabilities that facilitate maintaining an internet protocol session of an application, the first set of capabilities being a subset of a defined system set of capabilities; and
  response means for responding to the query with a list of values of a potential next network node for the query capabilities,
  wherein the apparatus is configured to relocate the internet protocol session of a mobile node during a network layer handover in a mobile communication system, the mobile communication system being configured to provide a defined system set of capabilities that are fully or partially supported by one or more network nodes of the mobile communication system.

30. An apparatus, comprising:
a processor configured to:
  receive from a mobile node of a mobile communication system application context information on the mobile node;
  detect from the application context information on the mobile node a first set of capabilities that facilitate maintaining an internet protocol session of an application, the first set of capabilities being a subset of a defined system set of capabilities; and
  query, from a potential next network node, capability information on the first set of capabilities,
  wherein the apparatus is configured in the mobile communication system, the mobile communication system being configured to provide a defined system set of capabilities that are fully or partially supported by one or more network nodes of the mobile communication system.

31. An apparatus, comprising:
receiving means for receiving from a mobile node application context information on the mobile node;

detection means for detecting, from the application context information on the mobile node, a first set of capabilities of a network node that facilitate maintaining an internet protocol session of an application, the first set of capabilities being a subset of a defined system set of capabilities;

querying means for querying from a potential next network node capability information on the first set of capabilities; and determination means for determining an applicability of the potential next network node for relocation of the internet protocol session by the capability information on the first set of capabilities, wherein the system is configured to support relocation of the internet protocol session of the mobile node during a network layer handover and to provide a defined system set of capabilities that are fully or partially supported by one or more network nodes of the system.

32. A mobile node apparatus, comprising:
a processor configured to:
generate application context information based on at least one ongoing internet protocol session in system;
send the application context information and monitoring information to a network node;
receive from the network node matching information indicating whether a first set of capabilities the derived from the application context information in the network node matches with a set of capabilities supported by one or more network nodes of the system, the first set of capabilities facilitating maintaining the internet protocol session of an application, and being a subset of a defined system set of capabilities; and
utilize the matching information in selection of the next network node.

33. A processor configured in a mobile node for a system configured to provide a defined system set of capabilities that are fully or partially supported by one or more network nodes of the system, and the processor being configured to:
generate application context information based on at least one ongoing internet protocol session in system;
detect from the application context information a first set of capabilities that facilitate maintaining the internet protocol session of an application, the first set of capabilities being a subset of a defined system set of capabilities;
query, from a potential next network node, capability information on the first set of capabilities; and
determine an applicability of a potential next network node for relocation of the internet protocol session by the capability information on the first set of capabilities.

34. A processor configured in a mobile node for a system configured to provide a defined system set of capabilities that are fully or partially supported by one or more network nodes of the system, the processor being configured to:
generate application context information based on at least one ongoing internet protocol session in system;
send the application context information and monitoring information to a network node;
receive from the network node matching information indicating whether a first set of capabilities the derived from the application context information in the network node matches with a set of capabilities supported by one or more network nodes of the system, the first set of capabilities facilitating maintaining the internet protocol session of an application, and being a subset of a defined system set of capabilities; and
utilize the matching information in selection of the next network node.

35. A computer readable storage medium encoded with instructions that, when executed by a computer in a mobile node, perform:
generating application context information based on at least one ongoing internet protocol session in system;
detecting from the application context information a first set of capabilities that facilitate maintaining the internet protocol session of an application, the first set of capabilities being a subset of a defined system set of capabilities;
querying, from a potential next network node, capability information on the first set of capabilities; and
determining an applicability of a potential next network node for relocation of the internet protocol session by the capability information on the first set of capabilities.

36. A computer readable storage medium encoded with instructions that, when executed by a computer in a mobile node, perform:
generating application context information based on at least one ongoing internet protocol session in system;
sending the application context information and monitoring information to a network node;
receiving from the network node matching information indicating whether a first set of capabilities the derived from the application context information in the network node matches with a set of capabilities supported by one or more network nodes of the system, the first set of capabilities facilitating maintaining the internet protocol session of an application, and being a subset of a defined system set of capabilities; and
utilizing the matching information in selection of the next network node.

* * * * *